United States Patent [19]

Amarello

[11] Patent Number: 5,706,940
[45] Date of Patent: Jan. 13, 1998

[54] WATER-RESISTANT CONTAINER FOR PORTABLE RADIO

[76] Inventor: John Amarello, 16 Baldwin St., Fall River, Mass. 02720

[21] Appl. No.: 331,195

[22] Filed: Oct. 28, 1994

[51] Int. Cl.[6] .............................. B65D 85/38; H05K 5/00
[52] U.S. Cl. .................... 206/320; 383/41; 383/66
[58] Field of Search ................ 150/165; 206/305, 206/320; 383/66, 97, 108, 113, 41; 361/814; 455/351

[56] References Cited

U.S. PATENT DOCUMENTS

| | | | |
|---|---|---|---|
| 2,467,471 | 4/1949 | Goldstein | 150/165 |
| 3,081,807 | 3/1963 | Lightburn | 206/320 |
| 4,489,770 | 12/1984 | Reich, II | 206/320 |
| 4,573,573 | 3/1986 | Favaro | 206/305 |
| 4,584,718 | 4/1986 | Fuller | 455/351 |
| 4,932,524 | 6/1990 | Hodson | 150/165 |
| 5,004,105 | 4/1991 | Freadman | 206/320 |
| 5,025,921 | 6/1991 | Gasparaitis et al. | 455/351 |
| 5,090,562 | 2/1992 | Grullemans | 206/320 |

FOREIGN PATENT DOCUMENTS

| | | | |
|---|---|---|---|
| 1032055 | 3/1953 | France | 455/351 |
| 2260894 | 5/1993 | United Kingdom | 383/66 |

*Primary Examiner*—Jimmy G. Foster

[57] ABSTRACT

A container in the general shape of a portable radio designed to encase such radio, made of flexible material such that it can be folded upon itself for storage yet be water-resistant. Said container having two mesh speaker covers incorporated therein allowing for the playing of the radio placed within it, with minimal listening interference or distortion.

2 Claims, 4 Drawing Sheets

WATER-RESISTANT CONTAINER FOR PORTABLE RADIO

BACKGROUND

1. Field of Invention

The present invention relates generally to a flexible, water-resistant container within which a portable radio is held and through which the radio can be heard with minimal listening interference or distortion.

2. Description of Prior Art

As currently developed, containers which may hold portable radios are generally made from soft plastic, leather or leather-like materials and cover much of the surface of the radio with the exception of the radio speakers which are left exposed so as not to block or distort the sound emitted from them. In fact, radio covers are rarely used by the general public as most radios are solidly constructed from plastic or metal to prevent breakage and existing covers do little to protect the radio itself from the potential damage of water or other liquids falling upon it and damaging its internal components as speakers are left open to the elements. The use of current waterproof containers with rigid outer surfaces would protect the radio components from water damage but would ruin sound quality while the radio was playing. The use of current waterproof containers with soft outer surfaces as in the U.S. patent granted to Edgerton, Jr., et al (1976) would also provide the same positive and negative features.

Consequently, all previously developed containers which may hold radios have the significant disadvantage of being inapplicable to the holding and carrying of radios while they are playing as they are either incapable of preventing water damage to the radio or, if they possess a waterproof or water-resistant feature, interfere with the sound quality to the point that its utility is outweighed by this flaw. This is particularly Significant when realizing the number of radios, especially large radios or "boom boxes" as they are popularly referred to, which are used at a beach or used by workpeople at job-sites and the damage which can be done to them by water, salt, paint or other contaminants.

Therefore, there exists a need for a container to hold a portable radio which is either waterproof or water-resistant yet allows for minimal listening interference or distortion.

SUMMARY OF THE INVENTION

Accordingly, a container in the general shape of a portable radio designed to encase such radio, made of flexible material such that it can be folded upon itself for storage yet be water-resistant. Said container having two mesh speaker covers incorporated therein allowing for the playing of the radio placed within it, with minimal listening interference or distortion.

The invention provides the user with a water-resistant protection for his or her radio while allowing the radio to function normally.

DESCRIPTION OF THE PREFERRED EMBODIMENTS

Figure 1:
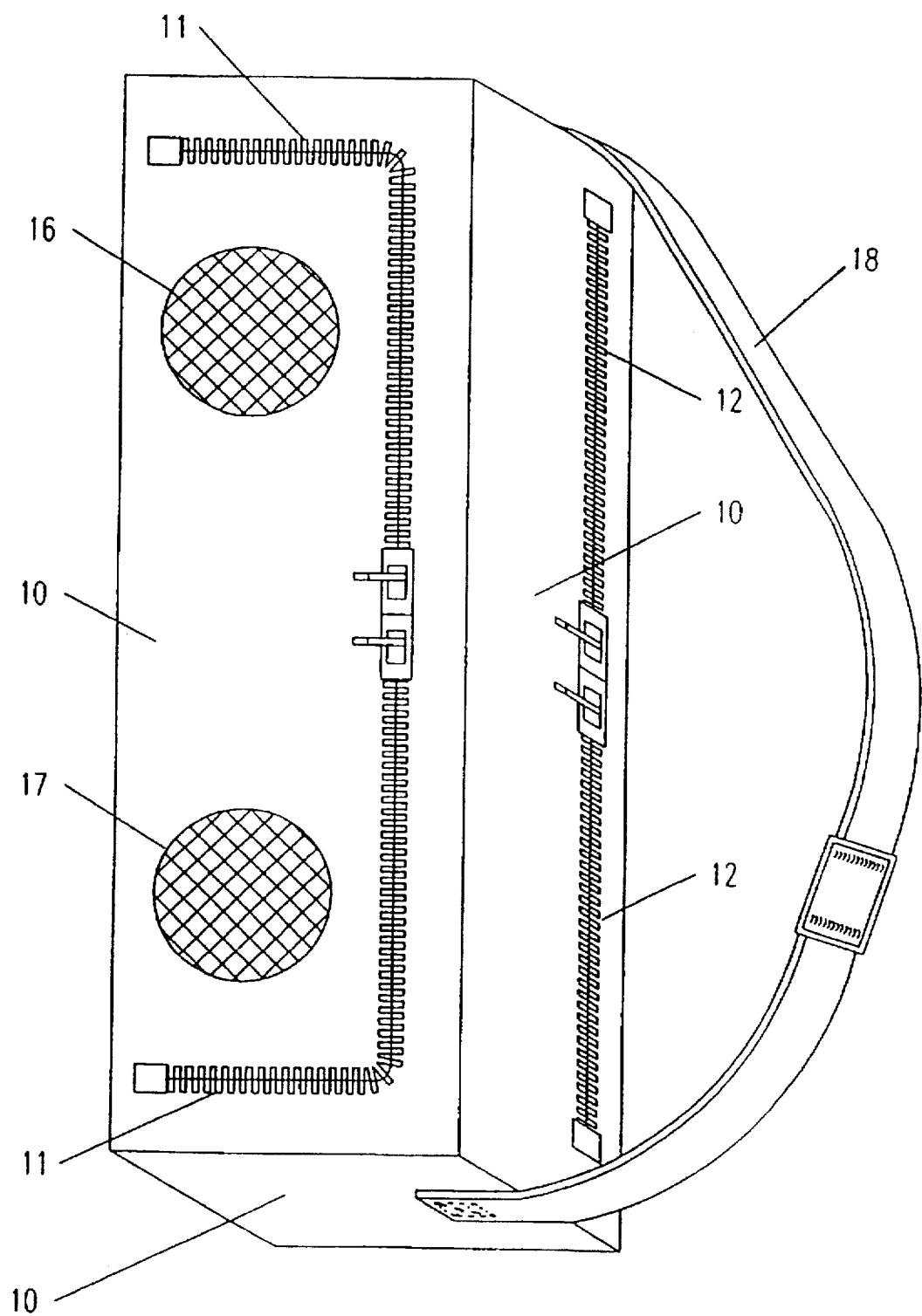
FIG. 1 provides a three dimensional overview of the front of the invention as it would appear when encasing a large radio with two large frontal speakers.
Figure 2:
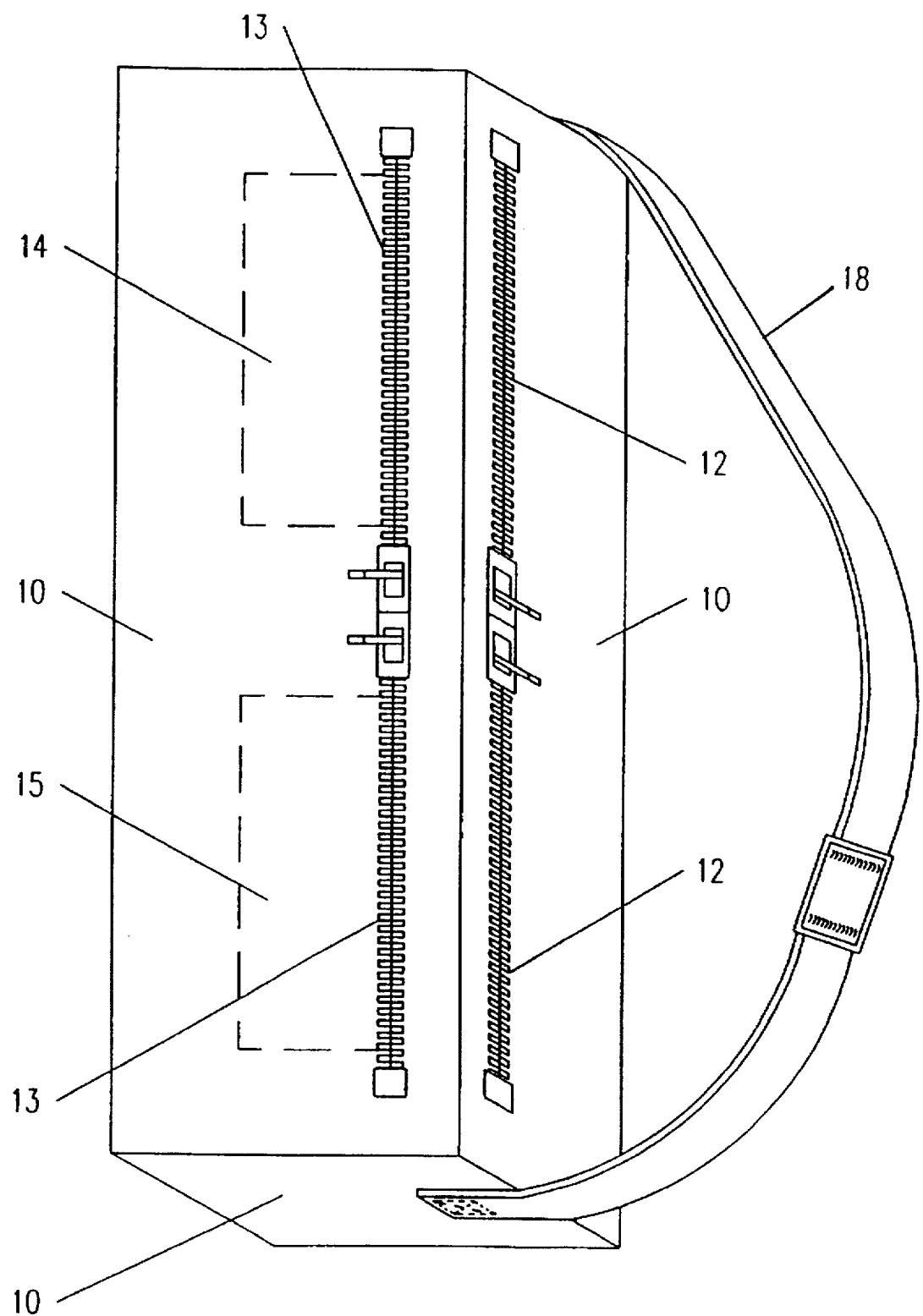
FIG. 2 shows a three dimensional overview of the rear of the invention as it would appear when encasing a large radio with two large frontal speakers.
Figure 3:
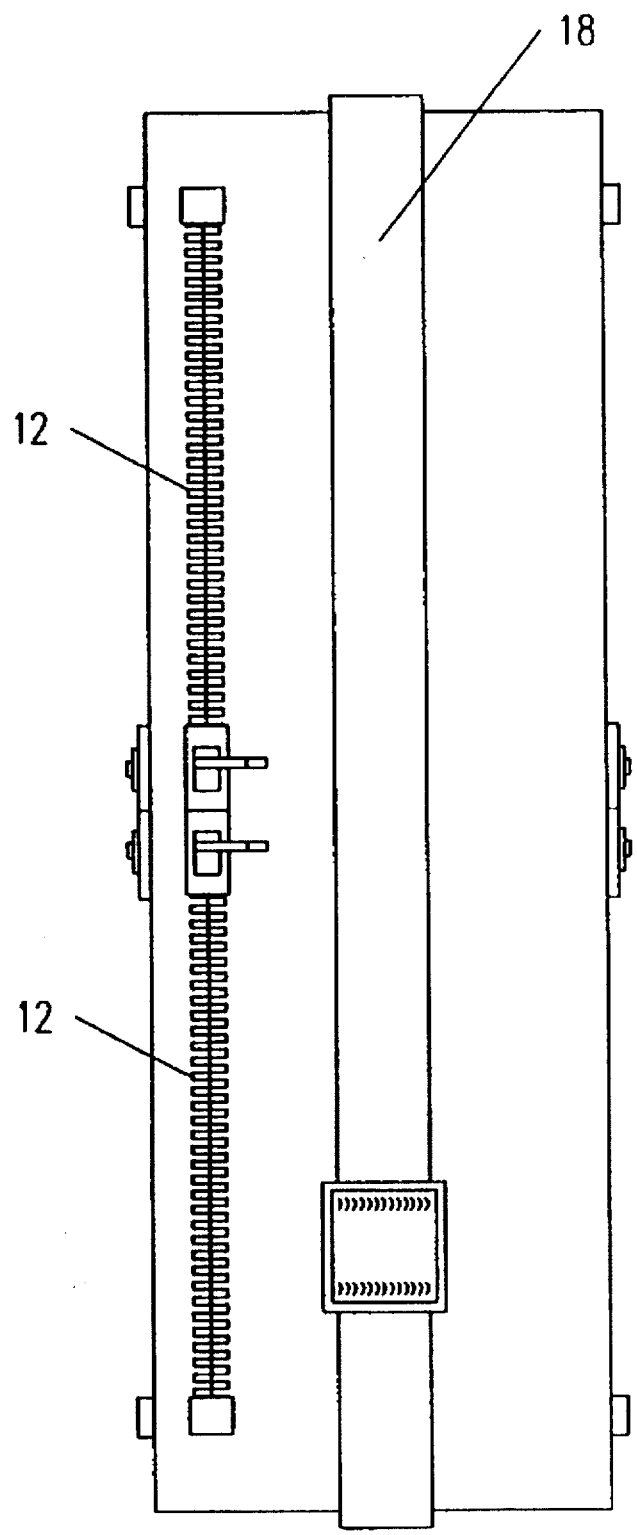
FIG. 3 depicts a top view of the invention as it would appear when encasing a large radio with two large frontal speakers.
Figure 4:
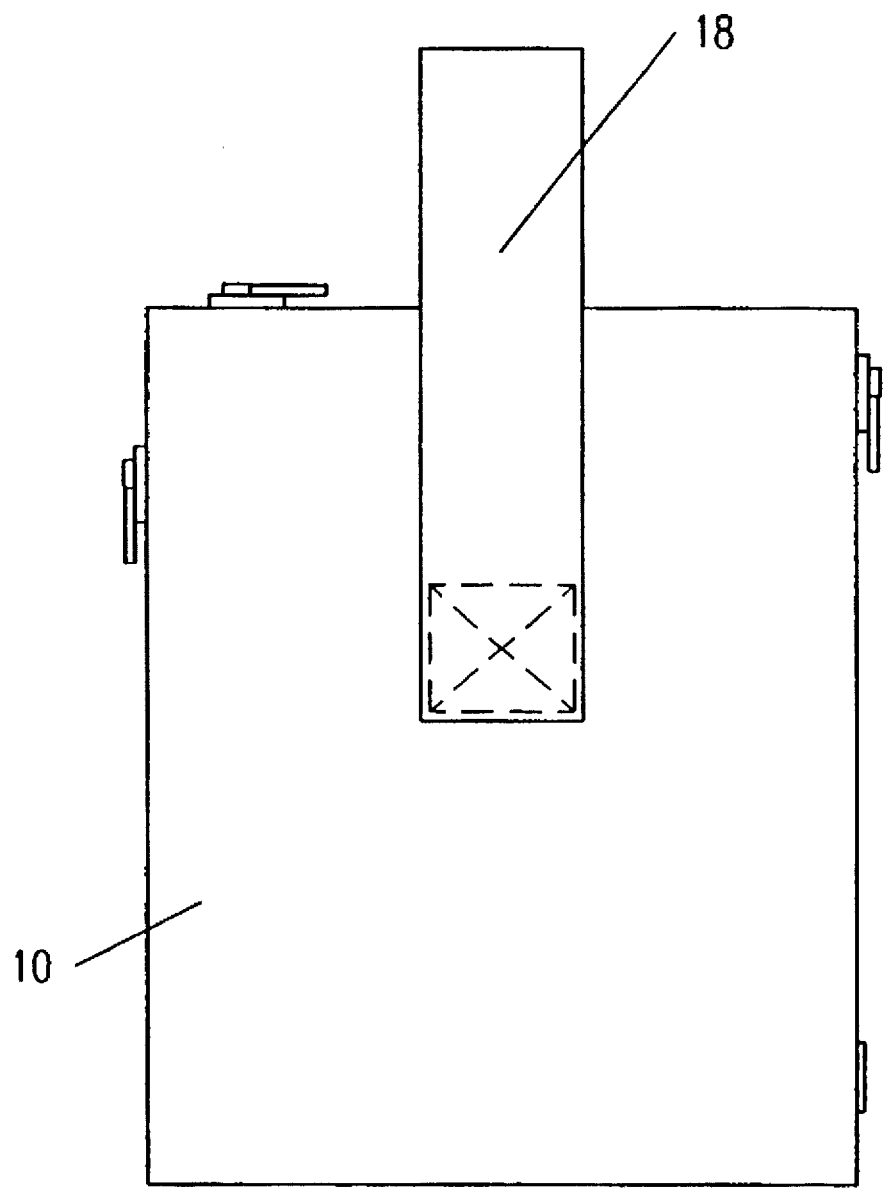
FIG. 4 illustrates side views of the invention as it would appear when encasing a large radio with two large frontal speakers.

Referring to FIGS. 1 through 4, the perimeter of the invention shown at (10) is constructed of a durable, waterproof treated cloth, plastic or plastic-like commercially available material which is flexible to the point that it can be folded upon itself. The "seam" of the invention is illustrated in (11) whereby entry is made into the invention through the means of an opening which is sealed with a zipper or other commercially available closure device in a waterproof or water-resistant manner. The radio is inserted into the invention through the opening of the above "seam." Further openings are shown at (12) and (13) which are also capable of being closed with a zipper or other commercially available closure device. These openings may serve as pocket containers to allow the user to place within them various items to be kept waterproof or water-resistant or as openings through which antennae may protrude. Within the inner wall of the rear portion of the container at (14) and (15) compartments may be attached in a manner that the placing of items in the pocket will allow them to fall into these compartments. The mesh speaker covers are shown at (16) and (17) and are constructed of a water-resistant treated cloth, plastic or plastic-like commercially available material which permits the emission of sound from the radio within through said mesh with minimal interference or distortion to the listener. The carrying strap or handle of the invention is shown at (18) and is also constructed of treated cloth, plastic or plastic-like material.

Upon the placement of the radio into the invention through the use of the opening created when the "seam" is opened with the attached commercially available closure device, all openings are resealed and the invention is carried with the radio inside by means of the carrying strap or handle.

While a particular embodiment of the invention is shown, it will be understood by those skilled in the art that changes and modifications may be made thereto without departing from the invention in its broader aspects and as set forth in the following claims.

What is claimed is:

1. A water-resistant container adapted to hold a portable radio, comprising:

a plurality of walls constructed and configured to encase a radio, said walls being made of a flexible, water-resistant material, said walls including first and second opposed walls, said first opposed wall having opposite edge margins;

a first opening through said opposed first wall, said first opening including a first part running horizontally along an upper portion of a face of said first opposed wall to said opposite edge margins, said first opening also including additional parts joined to said first part, said additional parts extending vertically downward along each said opposite edge margin;

closure means for closing said first opening in a water-resistant manner;

a second opening through said first opposed wall, said second opening being covered by a water-resistant mesh material adapted to permit sound to penetrate therethrough;

a third opening through said second opposed wall, said third opening running horizontally along an upper portion of a face of said second opposed wall;

closure means for closing said third opening in a water-resistant manner.

2. A container as set forth in claim 1, wherein said water-resistant material comprises plastic or water-resistant treated cloth.

* * * * *